Figure 1:
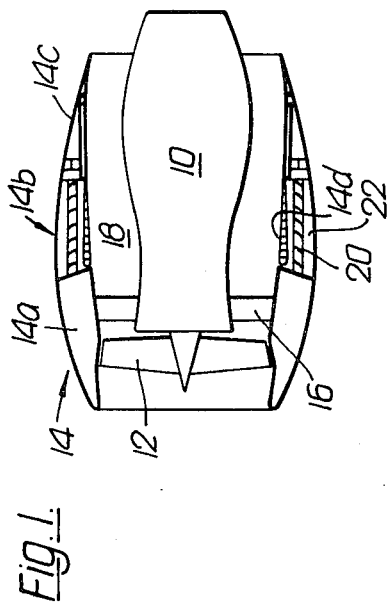

United States Patent [19]

Taylor

[11] 4,177,639

[45] Dec. 11, 1979

[54] THRUST REVERSER FOR A FLUID FLOW PROPULSION ENGINE

[75] Inventor: Maurice I. Taylor, Allestree, England

[73] Assignee: Rolls-Royce Limited, London, England

[21] Appl. No.: 896,021

[22] Filed: Apr. 12, 1978

[30] Foreign Application Priority Data

Jun. 5, 1977 [GB] United Kingdom ............... 19009/77

[51] Int. Cl.² ............................................... F02K 1/20
[52] U.S. Cl. .............................. 60/226 A; 239/265.31
[58] Field of Search ................. 60/226 A; 239/265.31

[56] References Cited

U.S. PATENT DOCUMENTS

| 3,568,931 | 3/1971 | Mortlock | 239/265.31 |
| 3,620,022 | 11/1971 | Beale | 239/265.31 |
| 4,047,682 | 9/1977 | Brownhill | 239/265.31 |

*Primary Examiner*—Douglas Hart
*Attorney, Agent, or Firm*—Cushman, Darby & Cushman

[57] ABSTRACT

In a gas turbine ducted fan engine, the inner wall portion which during cruise blocks the inner end of the reverser outlet, and the blocker flaps are separate entities which are aligned with each other in an upstream, downstream direction. This enables inter alia, the inner wall portion to be of much stiffer construction than hitherto, per unit volume of material used and thus improves sealing of the fan duct.

3 Claims, 4 Drawing Figures

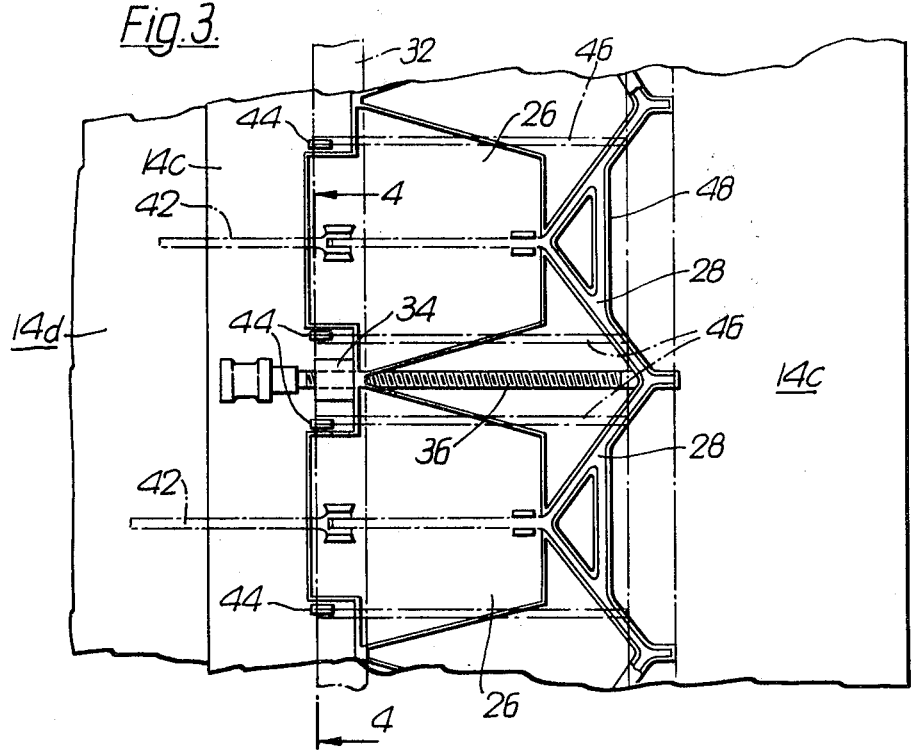
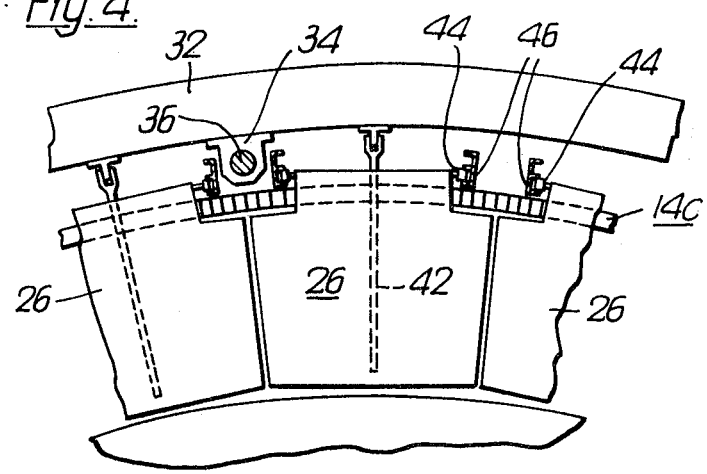

THRUST REVERSER FOR A FLUID FLOW PROPULSION ENGINE

This invention concerns a thrust reverser for a fluid flow propulsion engine.

Thrust reversers which are fitted to fluid flow propulsion engines e.g. of the type known as a gas turbine ducted fan propulsion engine, are complicated structures involving many moving parts which have to be sealed against leakage of propulsive fluid across them, when forward thrust is required rather than reverse thrust.

The object of the present invention is to provide a thrust reverser construction which has a minimum number of sealing edges of uncomplicated shape.

Accordingly the present invention comprises a gas turbine ducted fan propulsion engine including a core gas generator, a stage of fan blades mounted coaxially with and upstream of said core gas generator so as to be rotated thereby, a fan cowl surrounding said fan blades and forming with the core gas generator, a fan duct through which air acted upon by said fan blades passes to an exhaust nozzle, said fan cowl comprising a fixed upstream portion, a fixed downstream portion axially spaced therefrom to form a passage therebetween, a translatable intermediate portion which in a cruise position, closes said passage at its outer end with respect to the fan duct and a translatable cylinder which in said cruise position, closes said passage at its inner end, a plurality of blocker flaps arranged peripherally of and nested within, the inner surface of the fixed downstream portion and movably connected thereto by their upstream ends, for simultaneous translation axially of the duct and pivoting thereacross, said intermediate portion, cylinder and blocker flaps being interconnected via means adapted to also bring about simultaneous translation and pivoting of said respective intermediate portion, cylinder and blocker flaps, such that on said translation being achieved, said cylinder covers recesses left by said blocker flaps.

Each blocker flap comprises an assembly of at least one trapezoidal member and a further member, the assembly being articulated at mid length and hingedly joined by its upstream and downstream extremities to the downstream fixed cowl structure, the hinged joint at the upstream end being translatable relative to said fixed cowl structure.

Said means may comprise a plurality of rotatable ball screw mechanisms fixedly positioned on fixed structure and connected to the intermediate translatable cowl portion via a corresponding number of non-rotatable nuts supported from said cowl intermediate portion, so that on rotation of the ball screw, axial forces are exerted on said nuts, which causes said intermediate cowl portion to translate axially of the fan cowl.

The intermediate cowl portion, cylinder and blocker flaps, are interconnected via links extending from each said further member to said intermediate cowl portion and to said cylinder.

The further member of each flap assembly may comprise a link pivotally fixed to fixed structure at its downstream end and pivotally fixed to a respective blocker flap at its upstream end to achieve said articulation and so that on translation of the plurality of blocker flaps, each said link causes its respective blocker flap to pivot across the fan duct about the blocker flap upstream end.

Alternatively the further member may comprise a further flap, connected as a said link would be connected.

Figure 2:
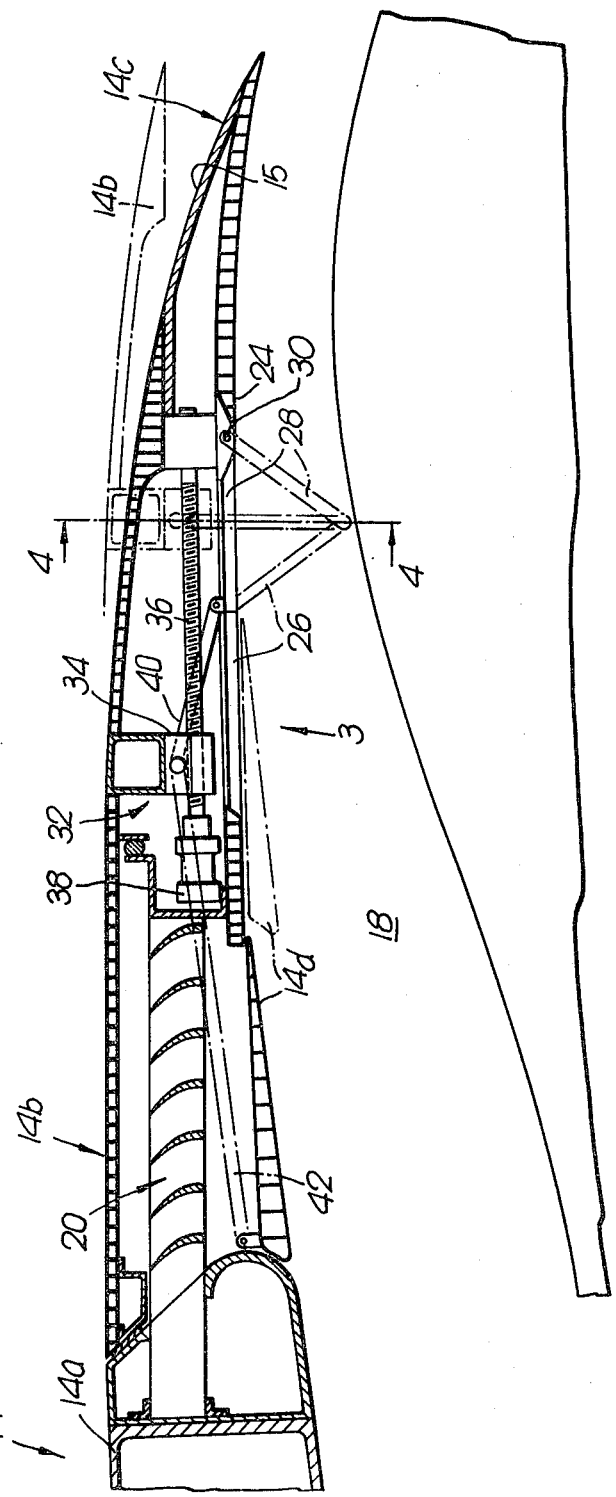

The invention will now be described by way of example and with reference to the accompanying drawings in which:

FIG. 1 is a diagrammatic part cross-sectional view of a gas turbine, ducted fan propulsion engine, FIG. 2 is an enlarged part view of FIG. 1, FIG. 3 is a view in the direction of arrow 3 in FIG. 2, and FIG. 4 is a view on line 4—4 of FIG. 2.

In FIG. 1 a gas turbine ducted fan propulsion engine comprises a core gas generator 10, a stage of fan blades 12 mounted for rotation at the upstream end of the core gas generator and a fan cowl 14 surrounding the stage of fan blades and the core gas generator 10 for a substantial portion of its length. Cowl 14 is spaced from the core gas generator by a row of radially projecting vanes 16, so as to form with the core gas generator, a fan duct 18.

Cowl 14 further comprises a fixed upstream portion 14a, an axially translatable portion 14b and a fixed downstream portion 14c. Portions 14a and 14c are joined by a rigid ring of cascade members 20 which in operation, deflect fan air forwardly of the engine.

Referring now to FIG. 2, cowl portion 14b comprises an outer, intermediate portion, cylindrical in shape and of a length sufficient to sealingly close the outer extremity of passage 22 between portions 14a,14c and an inner cylinder 14d which is also long enough to sealingly close the inner extremity of passage 22.

Cowl portion 14c has an outer wall 15 which is aerodynamically smooth and an inner wall 24 which has a plurality of fan duct blocker doors 26 nested within it, the blocker doors being arranged peripherally of the inner wall and, in an inoperative position, form with the corresponding surface of cylinder 14d a part of the fan flow duct outer boundary.

The downstream end of each blocker flap 26 is articulately connected to the upstream end of a respective link 28, the downstream end of which is hinged at 30 to the cowl portion 14c.

Intermediate cowl portion 14b has an annular stiffening ring 32 intermediate its ends and a plurality of ball nuts 34 are affixed thereto, the ball nuts being equiangularly spaced about the engine axis of rotation. Each ball nut is engaged by a respective ball screw 36 which is fixed to cowl portion 14c and, in operation, is rotated by a motor (not shown) via gear box 38.

Links 40 connect each link 28 to the underside of stiffening ring 32. Similarly further links 42 shown chain dotted for clarity, connect cylinder 14d to the same points on the underside of stiffening ring 32.

Referring now to FIG. 3, the upstream end of each blocker flap 26, has each corner relieved and rollers 44 are mounted there. These rollers are located in tracks 46 fixed to portion 14c. Links 28 are seen to be of 'A' shape, but this is not intended to be a limitation of the shape.

Links 28 and their associated blocker flaps 26 nest in a recess 48, machined out of the thickness of the inner wall of cowl portion 14c, the construction of which is of the known honeycomb sandwich kind.

In FIG. 4, blocker doors 26 are shown in their fan duct blocking position. To enable the blocker doors to adopt this position, which will be brought about when thrust reversal is required, ball screw 36 is rotated and the reaction forces exerted on the ball nut 34 moves intermediate cowl portion 14b in a downstream direction, to the position shown in dotted lines in FIG. 2. The same forces are also passed via links 40, to links 28, causing them to pivot about axes 30, inwardly across the fan duct 18. Links 28 in turn pull on blocker flaps 24 causing them to move downstream and at the same time, pivot across the fan duct, about the axes of rollers 44 to block the fan duct. The same forces further act, via links 42, to pull cylinder 14d in a downstream direction to the position shown in dotted lines (FIG. 2). Passage 22 is then clear and fan air can be deflected outwardly and forwardly to give reverse thrust.

The arrangement as described, provides a stronger, and more easily sealed assembly, in that cylinder 14d being a plain cylinder with no recesses or cut outs, is more rigid than a cylinder with these features, even if made from material having relatively thin portions. Thus, less deformity occurs under operating loads. Further, the cylinder requies to seal against egress of fan air, only at its upstream and downstream edges, there being no blocker door edges therein, to seal round; nor is the cylinder reduced in thickness intermediate, its ends, to provide recesses for blocker doors. The resistance to deforming assists in maintaining a seal. Moreover, links 28 provide a reaction force against any tendency of blocker flaps 26 to return to their nonoperative position during operation.

The arrangement described herein, also provides a more rigid structure in the form of fixed cowl portion 14c on which to mount blocker doors 26; more rigid that its, than cylinder 14d.

Closure of passage 22 is brought about simply by reversing the direction of rotation of ball screw 36.

I claim:

1. A gas turbine ducted fan propulsion engine including a core gas generator, a stage of fan blades mounted coaxially with and upstream of said core gas generator so as to be rotated thereby, a fan cowl surrounding said fan blades and forming with the core gas generator, a fan duct through which air acted upon by said fan blades passes to an exhaust nozzle, said fan cowl comprising a fixed upstream portion, a fixed downstream portion axially spaced therefrom to form a passage therebetween, a translatable intermediate portion which in a cruise position, closes said passage at its outer end with respect to the fan duct and a translatable cylinder which in said cruise positon, closes said passage at its inner end, a plurality of blocker flaps peripherally of and nested within the inner surface of the fixed downstream portion and movably connected thereto by their upstream ends, for simultaneous translation axially of the duct and pivoting thereacross, said intermediate portion, cylinder and blocker flaps being interconnected via means adapted to also bring about simultaneous translation and pivoting of said respective intermediate portion, cylinder and blocker flaps, such that on said translation being achieved, said cylinder covers recesses left by said blocker flaps.

2. A gas turbine ducted fan engine as claimed in claim 1 wherein the interconnecting means comprises a plurality of ball nuts fixed to, and angularly spaced around, the inner surface of the outer wall of the translatable portion, a corresponding number of rotary ball screws fixed between the fixed upstream and downstream cowl portions and threaded through respective ball nuts so that, on rotation of the ball screws said ball nuts and associated intermediate cowl portion move axially of the engine, a plurality of links connecting said ball nuts and respective blocker flaps and a further plurality of links connecting said ball nuts to the upstream end of the cylinder whereby on said movement of the ball nuts, said blocker flaps are caused to translate relative to the fixed downstream cowl portion and to pivot across the fan duct and said cylinder is caused to translate with said intermediate cowl portion to uncover and cover said passage.

3. A gas turbine ducted fan engine as claimed in claim 2 wherein the upstream end of said blocker flaps are connected via rollers to the downstream fixed cowl portion and the downstream ends of each blocker flap is connected via a link to the downstream fixed cowl portions, which link counteracts any tendency of the respective blocker flap to return to its inoperative position during thrust reversal.

* * * * *

UNITED STATES PATENT AND TRADEMARK OFFICE
CERTIFICATE OF CORRECTION

PATENT NO. : 4,177,639
DATED : December 11, 1979
INVENTOR(S) : Maurice I. Taylor It is certified that error appears in the above-identified patent and that said Letters Patent are hereby corrected as shown below:

In the above-identified patent, please change

"[30] Foreign Application Priority Data
Jun. 5, 1977 [GB] United Kingdom.......19009/77" to --[30] Foreign Application Priority Data
May 6, 1977 [GB] United Kingdom........19009/77--

Signed and Sealed this

Twenty-sixth Day of February 1980

[SEAL]

Attest:

SIDNEY A. DIAMOND

Attesting Officer     Commissioner of Patents and Trademarks